(No Model.) 7 Sheets—Sheet 2.

C. L. CARMAN & P. W. GATES.
STONE CRUSHER.

No. 530,087. Patented Dec. 4, 1894.

Witnesses:
Louis M. T. Whitehead
Lite J. Alter

Inventors
Charles L. Carman,
Philetus W. Gates.
by
Banning & Banning & Sheridan, Attorneys.

(No Model.) 7 Sheets—Sheet 4.

C. L. CARMAN & P. W. GATES.
STONE CRUSHER.

No. 530,087. Patented Dec. 4, 1894.

Fig. 4.

Witnesses:—
Louis M. F. Whitehead.
Lute G. Alter.

Inventors:
Charles L. Carman.
Philetus W. Gates.
by:—
Banning & Banning & Sheridan, Attorneys.

(No Model.) 7 Sheets—Sheet 5.

C. L. CARMAN & P. W. GATES.
STONE CRUSHER.

No. 530,087. Patented Dec. 4, 1894.

(No Model.) 7 Sheets—Sheet 6.

C. L. CARMAN & P. W. GATES.
STONE CRUSHER.

No. 530,087. Patented Dec. 4, 1894.

Witnesses:
Louis M. Whitehead.
Lute G. Alter.

Inventors:
Charles L. Carman.
Philetus W. Gates.
by Banning & Banning & Sheridan, Attorneys.

(No Model.) 7 Sheets—Sheet 7.

C. L. CARMAN & P. W. GATES.
STONE CRUSHER.

No. 530,087. Patented Dec. 4, 1894.

UNITED STATES PATENT OFFICE.

CHARLES L. CARMAN AND PHILETUS W. GATES, OF CHICAGO, ILLINOIS, ASSIGNORS TO THE GATES IRON WORKS, OF SAME PLACE.

STONE-CRUSHER.

SPECIFICATION forming part of Letters Patent No. 530,087, dated December 4, 1894.

Application filed August 1, 1894. Serial No. 519,139. (No model.)

*To all whom it may concern:*

Be it known that we, CHARLES L. CARMAN and PHILETUS W. GATES, of Chicago, Illinois, have invented certain new and useful Improvements in Stone-Crushers, of which the following is a specification.

Our invention relates to that class of rock or ore breakers which are provided with two crushing plates or jaws, the adjacent faces of which are suitably inclined to each other, one being adapted to reciprocate to crush such material as may be interposed between the crushing surfaces.

The object of our invention is to provide a simple, economical and efficient stone crusher; and the invention consists in the features and details of construction hereinafter described and claimed.

In the accompanying drawings.

In the class of rock or ore crushers above referred to, there are two well known divisions, viz., one having the greatest movement of reciprocating jaws at the top, and the other having the greatest movement of reciprocating jaws at the lower end. Those which come under the first class are limited to a comparatively small capacity, but will crush finer and more evenly than crushers of the other variety. The crushers which come under the second class have a comparatively greater capacity, but the product is coarser than that of the first class. To provide a machine which will have to a large extent the advantages of both of these classes, and be free from their defects or disadvantages, is the principal object of our invention.

In constructing our improved crusher, we make a frame, A, of the desired form and size, and provide it at its rear end—near the bottom—with two bearings, A', in which is mounted a crank shaft, B, located about midway of the frame. Extending upward and rearwardly is placed a stationary crushing jaw or plate, C, which is firmly held in place in recesses or grooves, $A^2$, formed in the inner sides of the main frame, and clamped therein by means of the extensions, $A^3$ and $A^4$, on the main frame by the bolts, $A^5$, which pass through them and the lugs, $A^6$ and $A^7$. The stationary crushing plate is provided on the front at each edge with a recess, $C^2$, into which project suitably formed lugs, $A^8$, on the main frame extensions, $A^3$ and $A^4$, thereby securing the crushing plate against any longitudinal movement in the grooves, $A^2$.

We prefer, for the sake of convenience in construction, to provide the rear face of the stationary crushing plate with two series or sets of semi-circular toggle-bearing grooves, $C^3$, extending horizontally across its surface. The pitch line on which the center of these semi-circular grooves is formed is of a circle whose radius is equal to the distance from center to center of the semi-circular ends, D' and $D^2$, of the toggle plate, D, and is of a diameter identical with the diameter of the semi-cylindrical end, D', of the toggle plate, as is clearly shown in Fig. 5 of the drawings. These grooves form seats, or—as we prefer to designate them—bearings for the reception of the semi-cylindrical end of the toggle plate. The two series of semi-circular grooves in the rear of the stationary crushing plate are provided for the reason that we desire to invert the position of this crushing plate to equalize the wear on the crushing surface of the same. It will be understood by those skilled in the art that the greatest wear comes at that portion of the crushing surfaces where they nearest approach each other, so that the lowest corner, $C^4$, of the crushing surface is subjected to the greatest wear. In order to equalize this wear, we have provided a stationary crushing plate that may be inverted, so that when it is inverted there is a second set of semi-circular grooves in which the toggle plate may rest and have its stationary fulcrum point.

The reciprocating crushing plate, E, is placed at the front end of the machine, and partially between its sides. To actuate it, we provide tension bars, F and F', extending through bearings or grooves, E', formed near the upper and lower ends of the reciprocating crushing plate on the opposite side to its crushing surfaces. We provide a cross head, G, in the rear of the machine, the front side having a toggle seat, G', for the reception of the semi-cylindrical end, $D^2$, of the toggle plate, and we mount upon the rear or opposite side of the cross head a yielding member, H, which has preferably one or more springs, H', provided with suitable means for giving them any desired tension. The means we prefer, however, and which are illustrated in the accompanying drawings, are several springs, H', arranged on the rear face of the cross head and retained therein by a cross bar or housing, J, which incloses them on the sides, and is pressed against their outer ends by means of bolts, K, that pass through suitable openings in the cross head, springs, H', and the housing, and having their outer ends provided with nuts, K', to obtain the desired initial compression of the springs.

The lower tension bars, F', are passed through lugs, $G^2$, near the extremities of the cross head, through one of the springs, H', and through the housing, J, and are provided with nuts, $F^2$, to permit of the proper adjustment of their length. The upper tension bars, F, are passed through the reciprocating crushing plate as above described, directly back of and contacting the cross head in a suitable groove, so that the movements of this cross head impart directly a reciprocating motion to the reciprocating crushing jaw, while the tension bars, F', deliver their stress to the housing, J, which is thereby distributed to all the springs for purposes hereinafter fully described.

To support the reciprocating crushing plate, we provide flat springs, L, one near each end, having thin ends, L', clamped between lugs, $E^2$, which project from the edges of the reciprocating crushing plate near its grooves or bearings, and lugs, M', on the bearing caps, M, which retain the tension bars in place. These bearing caps are secured rigidly to the reciprocating crushing plate by means of the bolts, $M^2$. The extensions, $A^3$ and $A^4$, on the frame of the machine have lugs formed upon their front edges and about midway their height, upon which the center of the flat springs, L, rest, and to which they are secured by the washers, $L^2$, and bolts, $L^3$, thus forming yielding pivots to permit the reciprocating crushing plate to be moved substantially horizontally as may be desired, but supporting it rigidly in its vertical position. These springs should be so proportioned and of sufficient strength to sustain the weight of the reciprocating crushing plate, to prevent its being lifted by the action of the crushing material. While we have described these flat springs, L, as forming these yielding or flexible pivots for the reciprocating jaw, we do so because we prefer this construction, but these springs may be dispensed with and a modified construction formed by providing suspension links at each side of the reciprocating jaw, having one of their ends pivoted to the frame of the machine and the opposite ends pivoted preferably to the lower end of the jaw. This construction would give the reciprocating jaw a flexible pivot and permit the jaw to have an equal or variable motion at each end thereof.

Figure 1:
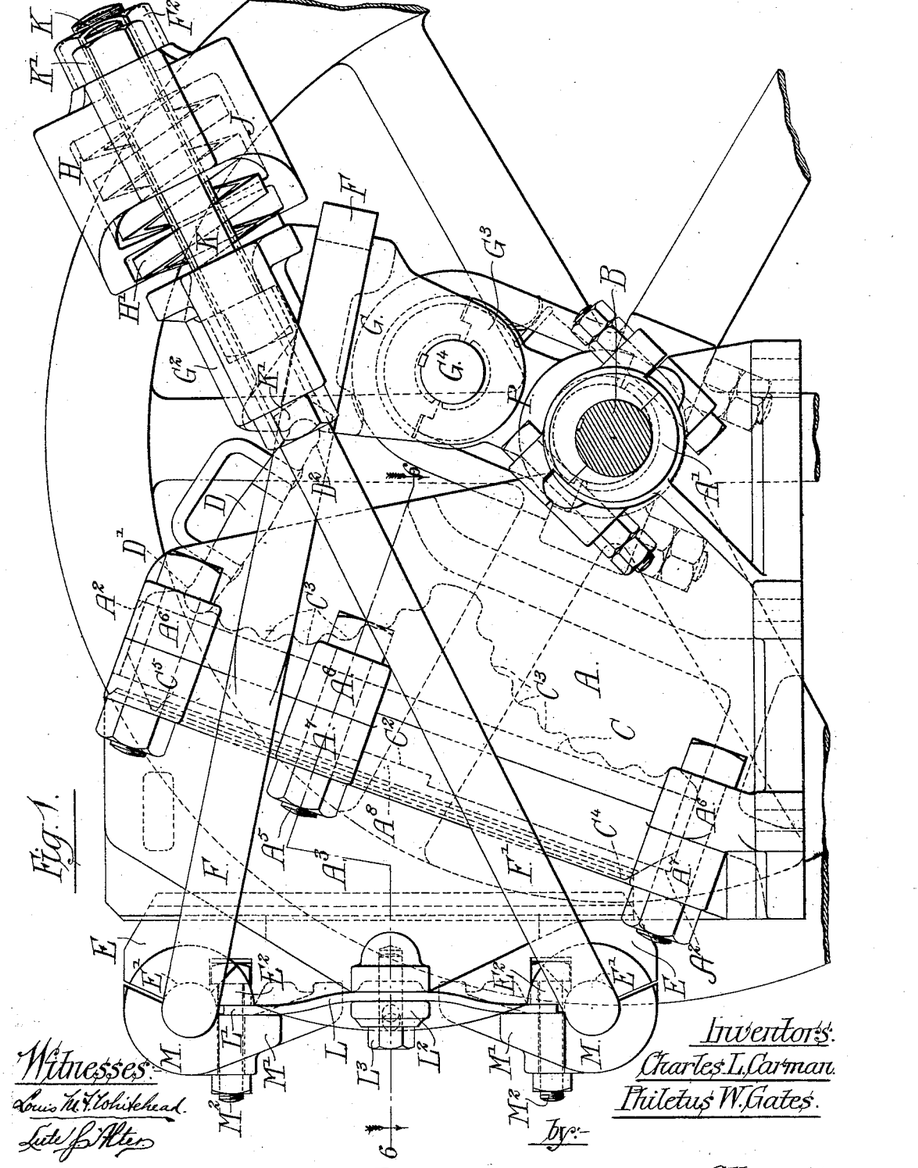
Figure 1 is a side elevation of our improved crusher.
Figure 2:
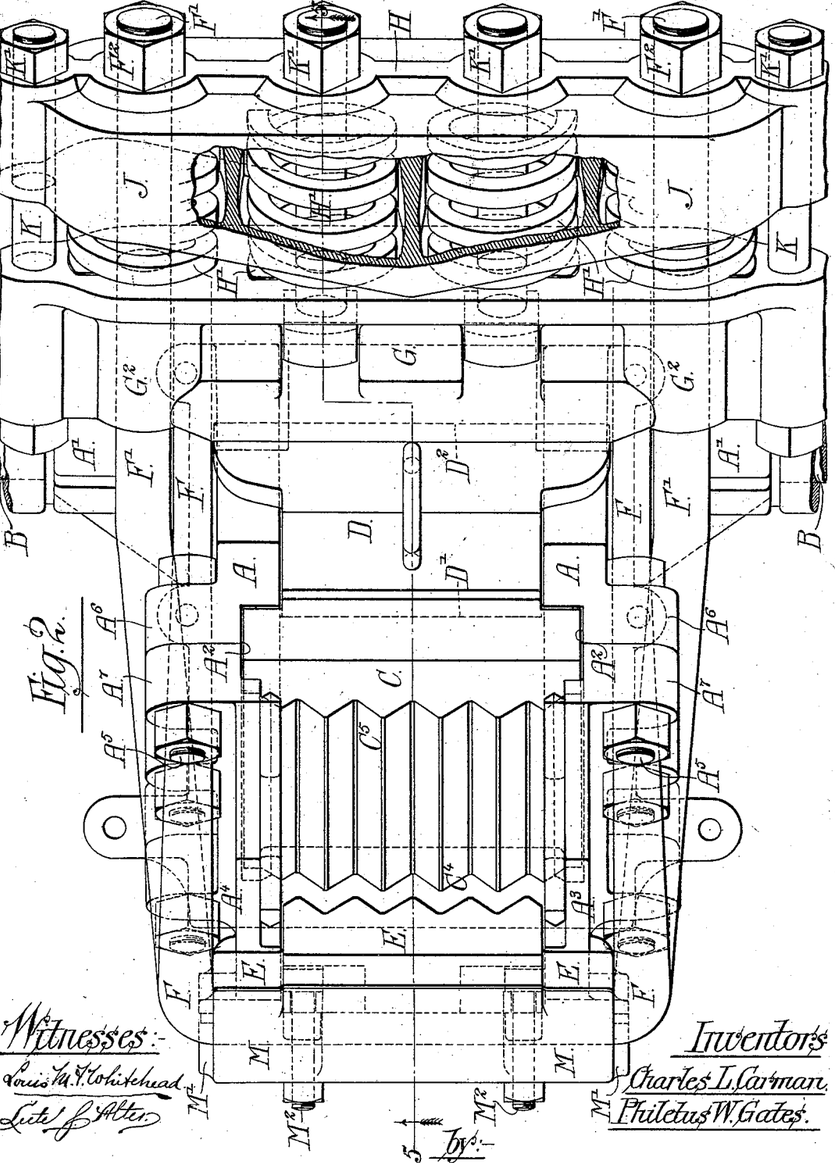
Fig. 2, a plan view of the same, looking at it from the top.
Figure 3:
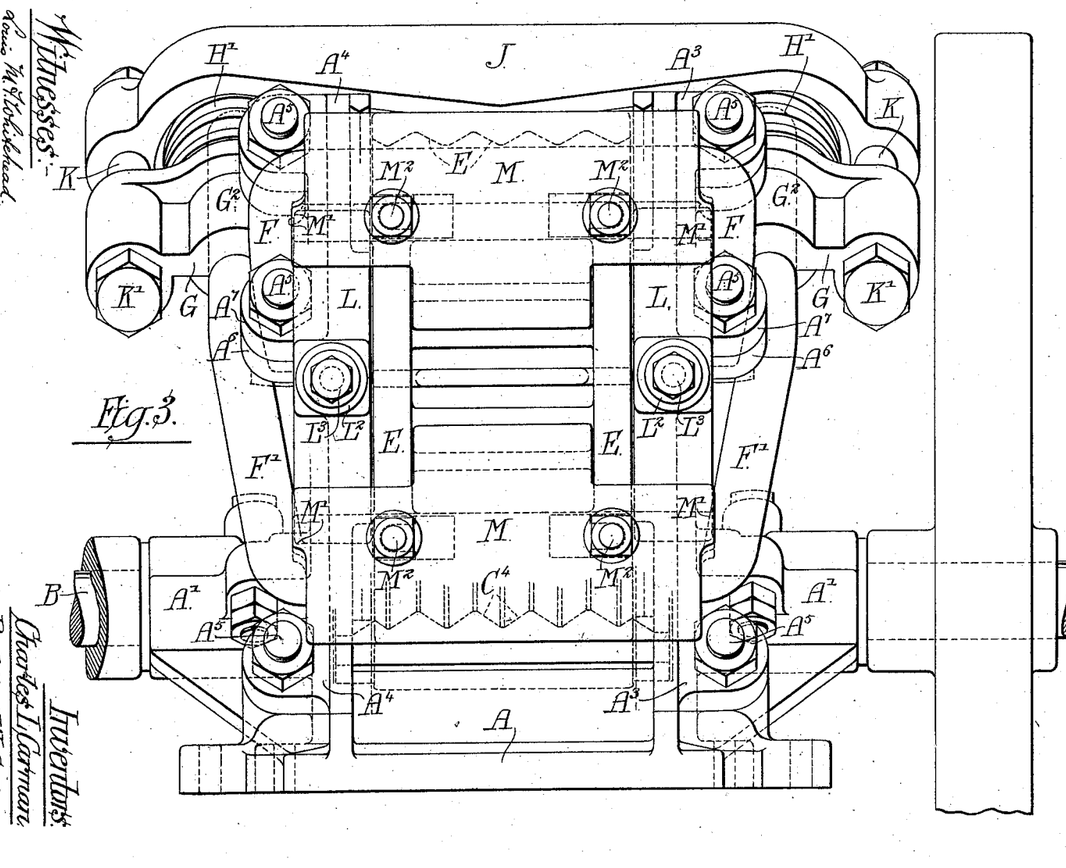
Fig. 3, a front elevation of the machine.
Figure 4:
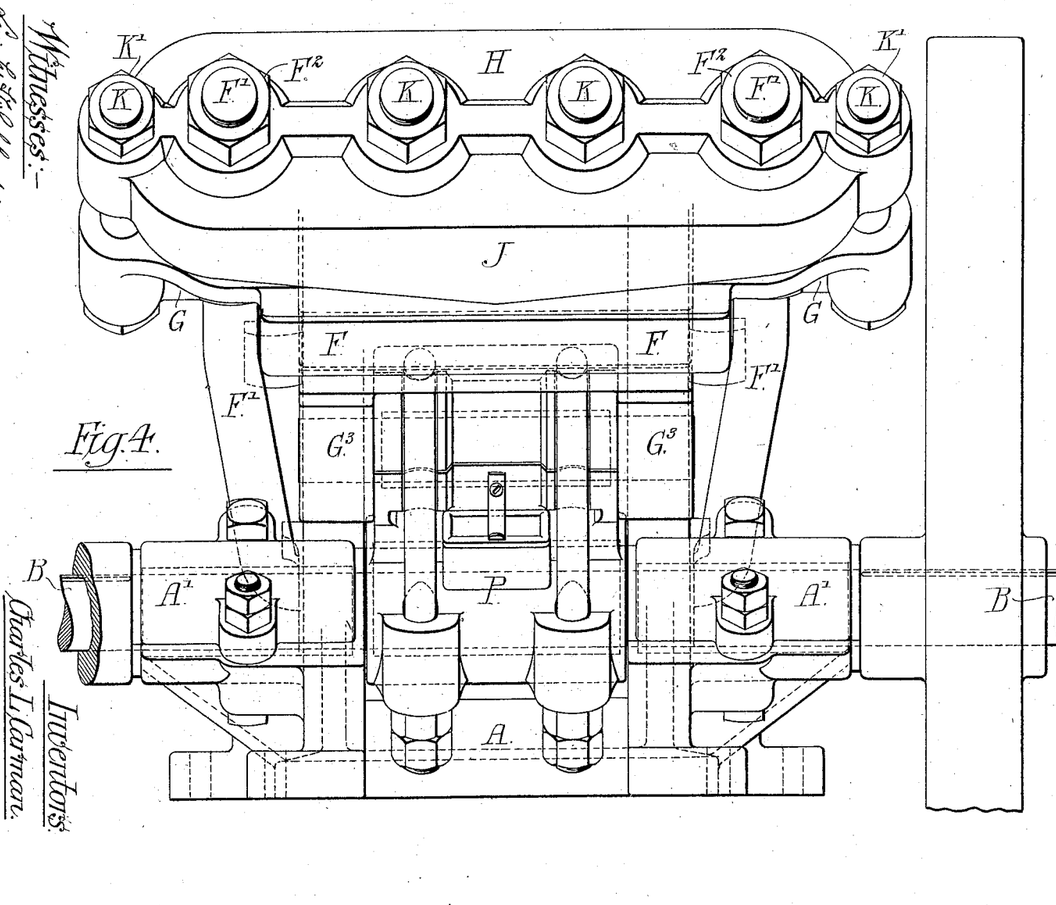
Fig. 4, a rear elevation.
Figure 5:
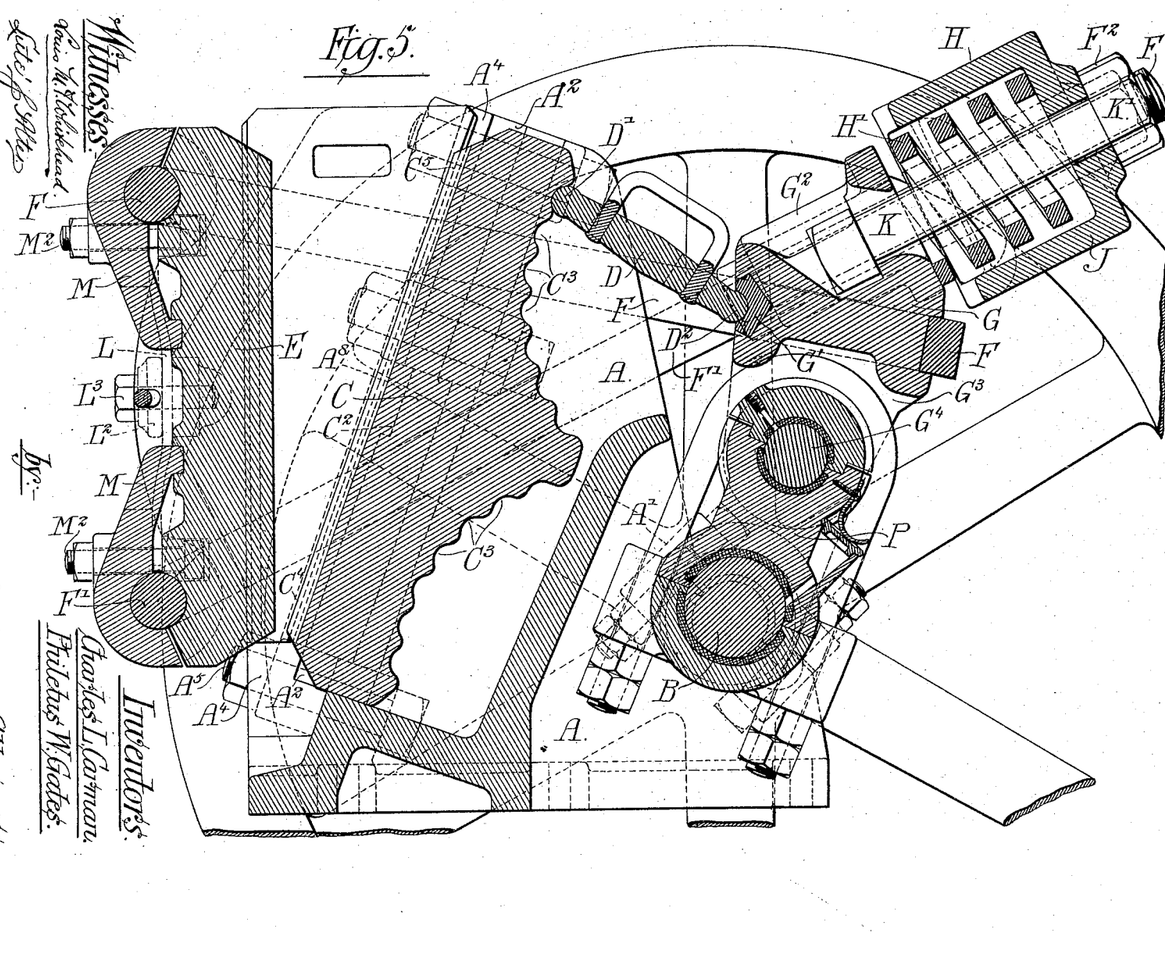
Fig. 5, a vertical longitudinal section on line 5 5 of Fig. 2.
Figure 6:
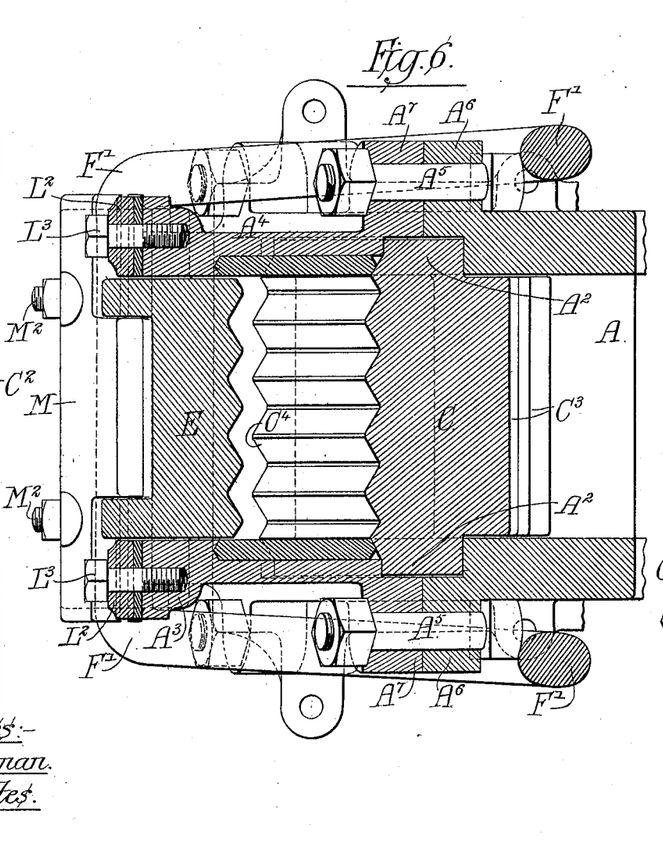
Fig. 6, a detail section on line 6 of Fig. 1.
Figure 7:
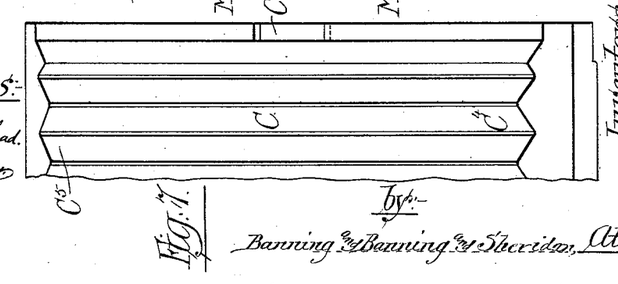
Fig. 7, a detail front elevation of a portion of the stationary crushing plate.
Figure 8:
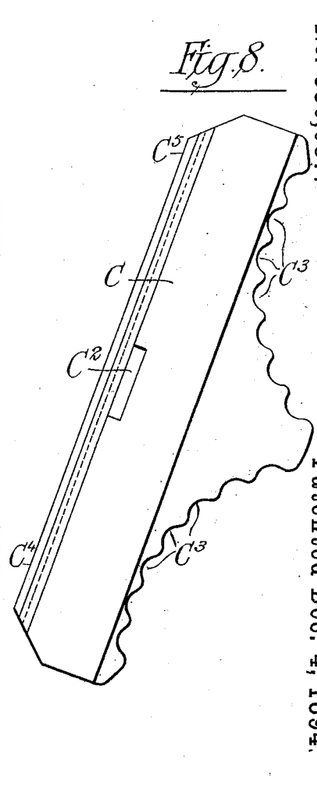
Fig. 8, a side elevation of Fig. 7.

To actuate the cross head, and by it the reciprocating crushing jaw, we provide it with two downwardly projecting lugs, $G^3$, through which is passed a journal pin, $G^4$—see Figs. 1 and 5—to form a connection between the cross head and the pitman, P, which is mounted upon and connected with a crank shaft, B, and actuated thereby. When the crank shaft is rotated, the cross head is reciprocated, by means of the pitman, through an arc of a circle whose center is coincident with the notch or groove in the back of the stationary crushing plate, which at that time may form the bearing for one end of the toggle. When one end of the toggle plate is seated in one of the lower notches of the stationary crushing plate, it is in proper position to do fine crushing; but, as is frequently the case with crushers having the least movement at the bottom of the reciprocating plate, it is liable to become clogged between the surfaces of the two crushing plates, and thus prevent a free exit of the finished material. In our machine, therefore, we have provided a yielding member formed as above described, and so arranged that it is adapted to receive the entire stress of the lower tension bar and be compressed to any desired degree until the resistance of the material between the crushing plate becomes equal to the initial compression; but when the crushing resistance becomes greater than the initial compression of the yielding member, the lower end of the reciprocating crushing plate will not partake of the forward crushing motion, but the cross head will be pushed to the full limit of its forward throw by the action of the toggle, pitman and crank, and the yielding member compressed to a still further degree at each stroke, thus preventing any breaking of the machine by furnishing a yielding release for the over stress caused by the excessive compression of the finely crushed material or slugs which might become interposed between such crushing surfaces.

The greatest wear on both of the crushing plates is invariably at their lower ends, where they are in closest proximity to each other. The adjustment for the wear, therefore, should be taken up principally at those points. This is done in our machine by screwing the nuts, $F^2$, on the upper ends of the lower tension bars. By this method any change in the opening between the lower ends of the crushing jaws may be obtained for this or other purposes, such as a change in the size of the crushed material. We also provide for the inverting of the reciprocating crushing plate, for the same purpose as hereinbefore described in illustrating the stationary crushing plate; and the crank shaft is provided with two fly wheels and a suitable driving pulley for the application and transmission of power.

In Figs. 9 to 14, inclusive, we have shown the toggle, D, in several of its different positions, which we will more fully describe. The line S S in each of those figures shows the same position of the face of the reciprocating crushing jaw as when the parts are in the initial position shown in Fig. 9, and by comparing it with the line of the first of the reciprocating jaws in the other figures, the difference in the two extremes of the crushing motion produced, by the change of the toggle end from one of these seats to another, may be readily perceived. The lines T T represent the center line of the tension members.

Figure 9:
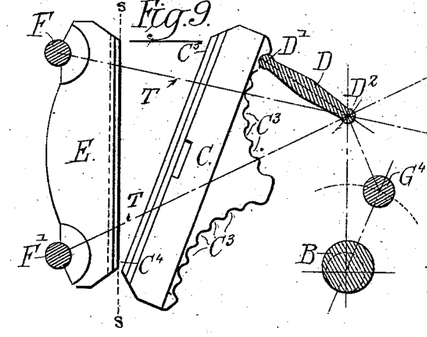
Figs. 9 to 14, inclusive, diagrammatic views showing the changes in the relation of the crushing jaws to each other when the toggle plate occupies different positions.
Figure 10:
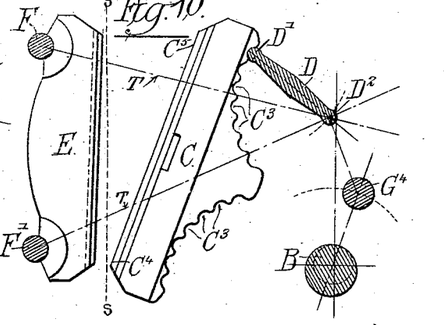

In Fig. 9 the parts are shown in the position they will assume at the finish of the crushing movement, with the toggle end shown in the upper toggle bearing groove; and Fig. 10 shows the opposite position, or that position which the parts will assume at the other extreme of the stroke, so as to produce the greatest movement of the reciprocating jaw at its lowest end.

Figure 11:
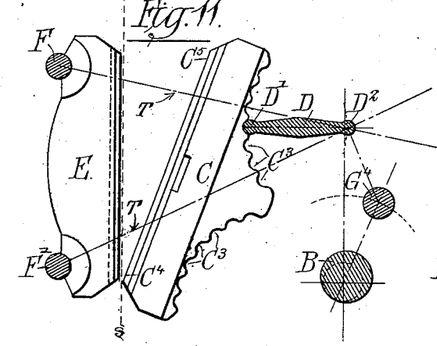
Figure 12:
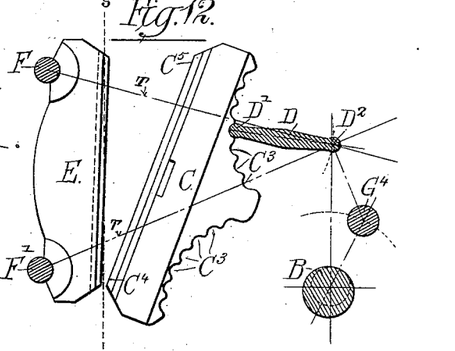

Fig. 11 shows the parts in the position assumed at the finish of the crushing movement when the toggle is located in an intermediate bearing groove—one below that shown in Figs. 9 and 10—while Fig. 12 shows the relative position of the parts at the other extremity, with the toggle in the same bearing groove as shown in Fig. 11.

Figure 13:
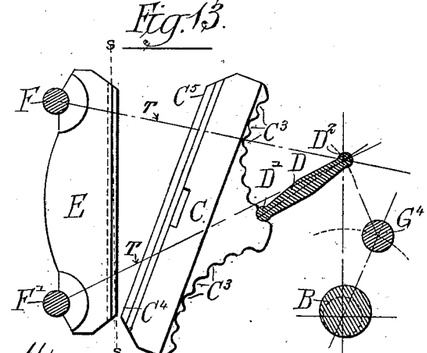
Figure 14:
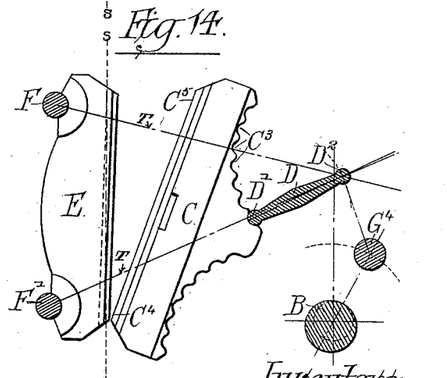

Fig. 13 shows the parts in the position they will assume at the end of the crushing movement, when the toggle end is located in a bearing groove nearest the center, so as to give the least movement to the jaw at its lower end; while Fig. 14 shows the parts in the position they will assume at the other extremity of the movement.

It will be noticed that an imaginary pivot or point, from which the face of the reciprocating crushing plate swings, will be located—when the parts are arranged as shown in Figs. 9 and 10—somewhere on the lines S S above the reciprocating plate; and it will be seen that this point or pivot is located about midway of the jaws in Figs. 11 and 12; and when the parts are arranged as shown in Figs. 13 and 14 this pivotal point will fall somewhere below the reciprocating crushing jaw, but not exactly on the line S S, because an extra length of pitman would be required to bring the toggle end, $D^2$, to such a position as to throw the reciprocating plate back to the normal line, S S, at the finish of the crushing stroke. It has not proved convenient to vary the length of the pitman, and as but a small reduction takes place at the top of the crushing machine, this does not affect the operation of the machine, and we, therefore, consider it inconsequential.

By a close inspection of the drawings, it will be noticed that the center lines connecting the center of the end, $D^2$, of the toggle plate and the center of the tension member seats on the reciprocating jaw, which coincide with the center line of the tension bars, present different angles to the center line of the toggle plate; and to that particular tension bar whose center line, T, presents the least angle to the center line of the toggle will be imparted the least movement. As a consequence that end of the reciprocating jaw to which it is attached will be moved to correspond. The arrangement, position and location of these bearing grooves for the toggle plate may be changed to suit circumstances or conditions. The rear surface of the stationary crushing plate may be smooth and this groove or grooves may be placed upon a suitable block connecting directly with or forming a portion of the main frame.

The advantages obtained by the use of our improvement, as described above in relation to Figs. 9 to 14, are, that we have provided a reciprocating jaw arranged to receive an equal or variable motion at each end of such jaw. By this we mean, that the imaginary pivot upon which the reciprocating jaw swings, as it advances and retracts, may be changed so that the greatest movement may be at the top or bottom, as desired, or at any intermediate point between the extremities, so that not only can the material be crushed to any grade desired, but the capacity of the machine may be also varied to suit special circumstances and conditions. It will thus be seen that in using the term "equal and variable motion at each end of the reciprocating jaw," we meant a jaw arranged to receive its greatest motion at the top or bottom, or any desired point.

While we have described our invention minutely and as embodied in more or less precise forms and arrangements, we do not desire to be limited thereto unduly, any more than is pointed out in the claims. On the contrary, we contemplate all proper changes in form, construction and arrangement, the omission of parts and the substitution of equivalents, as circumstances may suggest or necessity render expedient.

We claim—

1. In stone crushers, the combination of a stationary crushing jaw, a reciprocating crushing jaw opposite the stationary crushing jaw arranged to have an equal or variable motion at each end thereof, means for actuating the reciprocating jaw, and means for adjusting the actuating mechanism to impart an equal or variable motion to each end of the reciprocating jaw so that the position of the imaginary pivot upon which the reciprocating jaw swings is changed with each adjustment of the actuating mechanism, substantially as described.

2. In stone crushers, the combination of a stationary crushing jaw, a reciprocating crushing jaw opposite the stationary jaw arranged to have an equal or variable motion at each end thereof, toggle lever mechanism arranged to actuate the reciprocating jaw, and means for adjusting the position of the toggle to impart an equal or variable motion to each end of the reciprocating jaw so that the position of the imaginary pivot upon which the reciprocating jaw swings is changed with each adjustment of the toggle, substantially as described.

3. In stone crushers, the combination of a stationary crushing jaw provided with a series of toggle bearing grooves arranged on the arc of a circle for the reception of one end of a toggle plate, a reciprocating crushing jaw arranged to have an equal or variable motion at each end thereof, means for actuating the reciprocating crushing jaw, and a toggle plate adapted to have one end seated in any one of the series of toggle bearing grooves and its opposite end engaging with the actuating mechanism of the reciprocating jaw to impart an equal or variable motion to each end of the reciprocating jaw so that the position of the imaginary pivot upon which the reciprocating jaw swings is changed as the toggle is changed from one toggle bearing groove to another, substantially as described.

4. In stone crushers, the combination of a stationary crushing jaw, a reciprocating crushing jaw arranged to have an equal or variable motion at each end thereof, a frame portion to support the mechanism and provided with a series of toggle bearing grooves arranged on the arc of a circle for the reception of one bearing end of a toggle plate, means for actuating the reciprocating crushing jaw, and a toggle plate arranged to have one end seated in one of the series of toggle bearing grooves and its other end engaging with the actuating mechanism on the reciprocating jaw to impart an equal or variable motion to each end of the reciprocating jaw and regulate the position of the imaginary pivot upon which the reciprocating jaw swings, so that such position is changed as the toggle is changed from one toggle bearing groove to another, substantially as described.

5. In stone crushers, the combination of a reciprocating crushing jaw adapted to have equal or variable motions at each end thereof, an invertible crushing plate provided with series or sets of toggle bearing grooves so arranged that the position of one series will exactly coincide with the other when the position of the crushing plate is inverted, a toggle plate adapted to be seated in any one of the series of toggle bearing grooves and connected with the reciprocating jaw to impart an equal or variable motion to each end of the reciprocating jaw, and means for vibrating the toggle plate, substantially as described.

6. In stone crushers, the combination of a stationary crushing jaw, a reciprocating crushing jaw opposite the stationary jaw so that between such jaws material may be crushed, means for actuating the reciprocating jaw, tension bars connected with the lower end of the reciprocating crushing jaw and its actuating mechanism to impart a reciprocating motion to the crushing jaw, and a series of springs interposed between the actuating mechanism and the tension bar to which may be given an initial compression permitting yielding to strains beyond a predetermined amount, substantially as described.

7. In stone crushers, the combination of a stationary jaw, a reciprocating crushing jaw opposite the stationary jaw and between which material may be crushed, a pivot for the reciprocating jaw upon which it may be vibrated and reciprocated and which prevents a motion in the plane of the face, and means for actuating the reciprocating jaw, substantially as described.

8. In stone crushers, the combination of a stationary crushing jaw, a reciprocating crushing jaw mounted upon a laterally movable pivot and arranged to have an equal or variable motion at each end of the reciprocating jaw, and means for actuating the reciprocating crushing jaw, substantially as described.

9. In stone crushers, the combination of a stationary crushing jaw, a reciprocating jaw opposite thereto and between which and the stationary jaw material may be crushed, tension members connected with the upper and lower ends of the reciprocating jaw and the actuating mechanism to impart motion to such reciprocating jaw, and actuating mechanism to operate such tension members, substantially as described.

10. In stone crushers, the combination of a stationary crushing jaw, a reciprocating jaw opposite thereto and between which and the stationary jaw material may be crushed, tension rods connecting the upper end of the reciprocating crushing jaw with the actuating mechanism, adjustable tension bars connected with the lower end of the reciprocating jaw and the elastic yielding member, an elastic yielding member adapted to receive an initial compression and connected with the actuating mechanism, and actuating mechanism to operate such tension bars and thereby the reciprocating crushing jaw, substantially as described.

11. In stone crushers, the combination of a reciprocating crushing jaw adapted to have a variable reciprocating motion, a stationary crushing jaw between which and the reciprocating jaw material may be crushed, a series of toggle bearing grooves in the rear of the stationary jaw, a toggle plate having one end engaging with the actuating mechanism of the crusher and the opposite end engaging with one of the series of toggle bearing grooves and adapted to be seated in any of the others to impart a desired variable motion to the reciprocating jaw, tension members connected with the reciprocating crushing jaw and the cross head, a cross head, a pitman connecting the cross head and mounted upon a crank shaft, and a crank shaft for actuating the machine, substantially as described.

12. In stone crushers, the combination of a reciprocating crushing jaw adapted to receive a variable reciprocating motion, a stationary crushing jaw opposite thereto and between which and the reciprocating jaw material may be crushed, a pitman provided with a cross head mounted upon and adapted to be actuated by a rotating crank shaft, two sets of tension bars connecting the upper and lower ends of the reciprocating jaw with the cross head, a yielding member interposed between one set of the tension bars and the cross head to provide an initial yielding pressure, and a crank shaft upon which the pitman is mounted for actuating the crushers, substantially as described.

CHARLES L. CARMAN.
PHILETUS W. GATES.

Witnesses:
THOMAS F. SHERIDAN,
THOMAS B. MCGREGOR.